Oct. 19, 1954  K. MELLER  2,692,323
METHOD OF AND APPARATUS FOR ARC WELDING
Filed July 14, 1950 5 Sheets-Sheet 1

Inventor:
Karl Meller
By Knight Bros
Attorneys

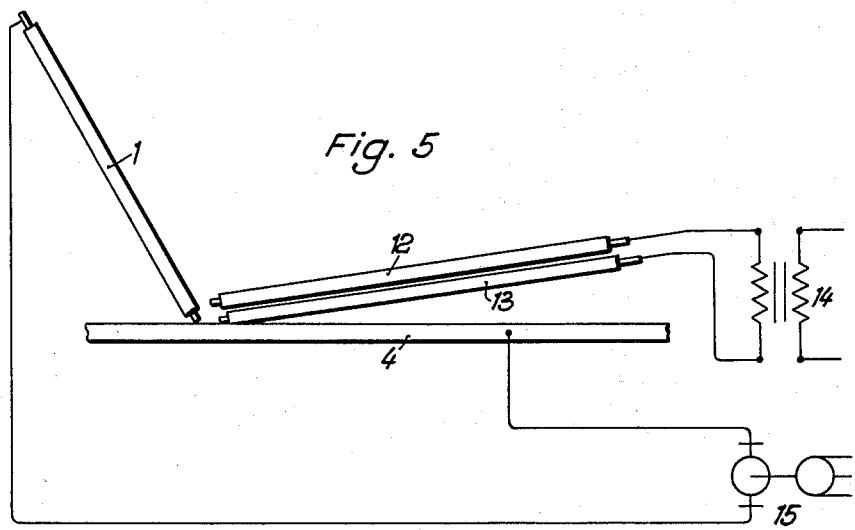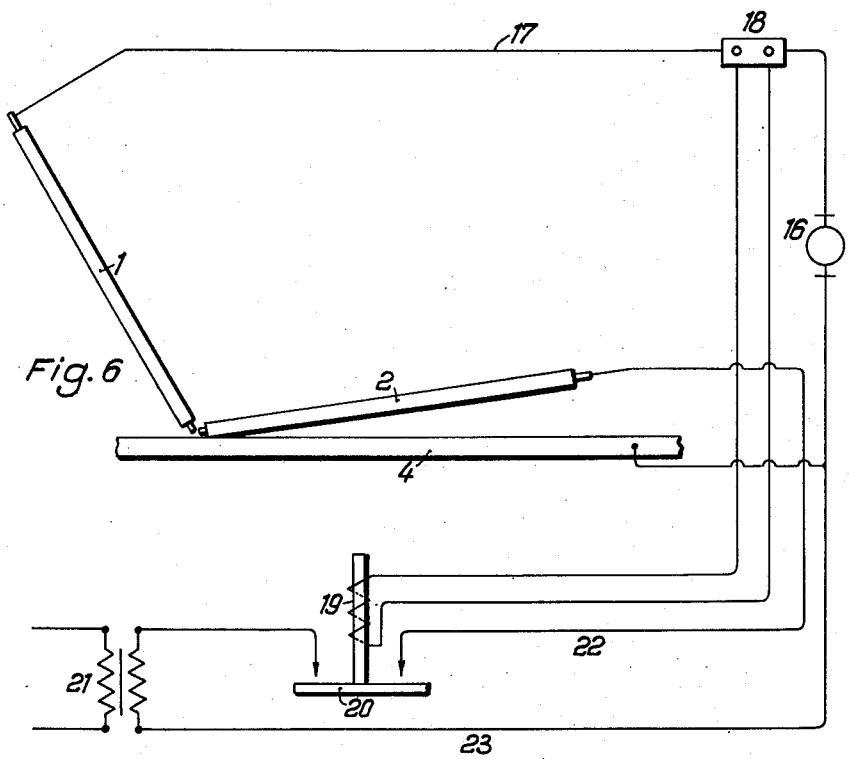

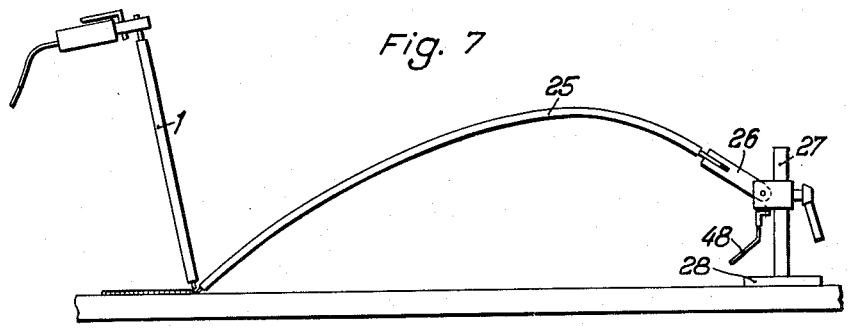
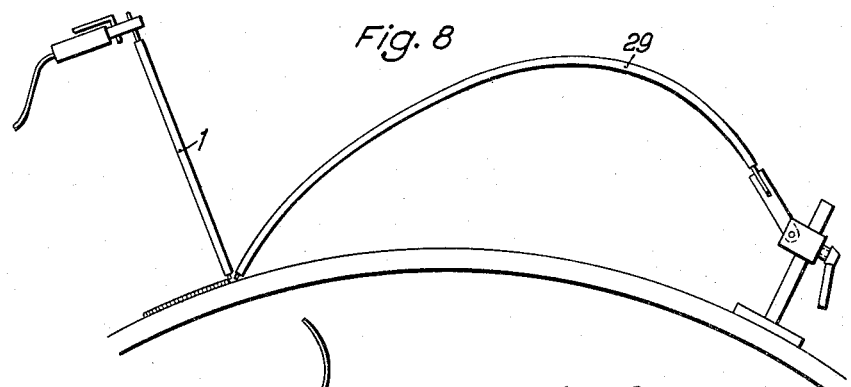
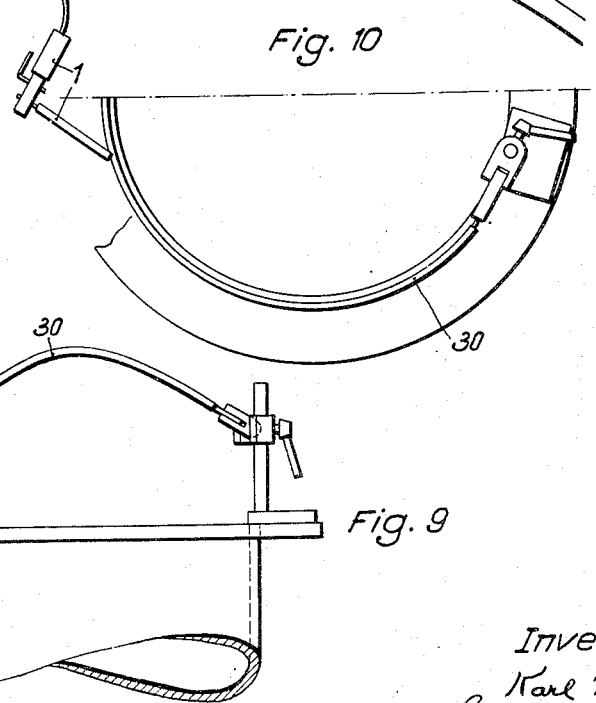

Oct. 19, 1954 K. MELLER 2,692,323
METHOD OF AND APPARATUS FOR ARC WELDING
Filed July 14, 1950 5 Sheets-Sheet 4

Inventor:
Karl Meller
By Knight Bros
Attorneys

Patented Oct. 19, 1954

2,692,323

UNITED STATES PATENT OFFICE 2,692,323

METHOD OF AND APPARATUS FOR ARC WELDING

Karl Meller, Koln-Rath, Germany

Application July 14, 1950, Serial No. 173,715

Claims priority, application Germany July 20, 1949

5 Claims. (Cl. 219—8)

The present invention relates to an arc welding method and apparatus. The most usual metal arc welding method is that of Slavianoff. In this method the welding output is limited by the diameter of the electrodes and the current permissible for use therewith. The general tendency is to raise this output limit. For this purpose, the simultaneous use of three electrodes connected through welding transformers to the three phases of a three-phase current supply has already been proposed. It has been impossible, however, to construct welding tongs, to hold the three electrodes and the three feed cables, which can be satisfactorily manipulated in practice, and in addition, it has not been possible to fuse the three electrodes uniformly. The last mentioned difficulty also applies to the use of a double electrode as employed in automatic welding machines. Here again, it is unfeasible to secure uniform fusion of electrode material into the work piece and to control the flow of slag.

It is an object of my invention to eliminate these disadvantages.

To this end, and in accordance with my invention, a welding electrode (fixed electrode) is pivotally mounted at the end at which it is connected to the current lead, and this electrode is kept inclined toward the work surface in the direction of the seam to be welded under the action of a force directed towards the work. Hence, the coating of the electrode at its free end comes into contact with the work material, and a first arc emanates from this electrode at the same time, a second, arc, emanating from a movable and manually guided electrode is also employed at the point of emanation of the first arc.

In accordance with another feature of the invention, the two arc circuits are separately energized, for instance, from separate transformers. It is then possible to produce greater thermal action on the electrodes or on the work. However, the power supply circuit of the fixed electrode may be connected to a transformer, while the circuit of the manually controlled electrode is connected to a converter. This affords a convenient coupling of the two circuits and a good control of the arcs.

According to another feature of the invention, the fixed electrode is bent to arch away from the work surface. Thus, a substantially constant angle with respect to the work surface is maintained during welding. This has the advantage of reducing the blowing action of the arc and increasing the burning-in effect at the seam.

In order to provide an increase in the welding speed, the holder of the mechanically-operated electrode may be moved, for example manually, in the direction in which the welding seam progresses.

If, for example, two electrodes, for example each of 4 mm. in diameter, are simultaneously welded with a fixed electrode holder, the thickness of the seam corresponds to the sum of the two fused electrode cross-sections. If only one cross-section corresponding, for example, to an electrode diameter of 4 mm., is required, the holder of the fixed electrode must be moved forward at a speed equal to the fusing-off speed of the fixed electrode. In this case, the welding speed is double that of manual welding with a 4 mm. electrode.

Therefore, in accordance with a further feature of the invention, the holder may be provided at the bottom with one or more rollers or the like, which engage in the welding kerf or gap. Furthermore, the holder may run on rollers and may be provided with a suitably regulatable driving motor. Such a device is of advantage particularly for the welding of seams of small thickness.

Several embodiments of the invention are shown in the accompanying drawings, wherein:

Fig. 5 shows an arrangement in which two fixed electrodes are provided;

Fig. 6 shows an arrangement in which the circuit of the fixed electrode is controlled by a relay whose coil is connected with the circuit of the manual electrode;

Fig. 7 shows the application of the method to rectilinear flat welding seams;

Fig. 8 shows the application of the method to cylindrical circular seams;

Fig. 9 shows in elevation the arrangement of the fixed electrode to the welding of a circular seam on flat work;

Fig. 10 is a plan view of Fig. 9;

Figure 1:
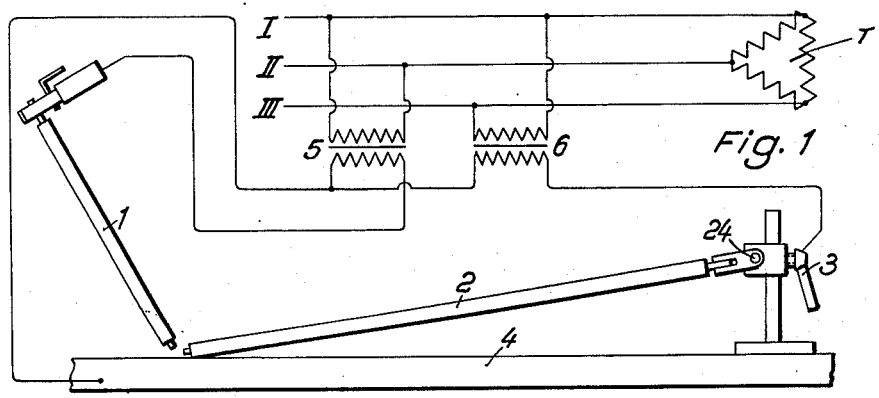
Figs. 1 and 2 show arrangements in which separate transformers are employed for supplying the welding current to the fixed electrode and to the manually-guided electrode.

According to Fig. 1, two welding electrodes 1 and 2 are provided to produce two adjacent arcs respectively during the welding operation. The electrode 2 is rotatably mounted at its cable end to an adjustable holder 3 by means of a pivot pin 24. The welding end of the electrode is loosely supported on the work pieces 4 by the electrode covering. The electrode is inclined with respect to the work piece, and the electrode axis lies in a vertical plane extending through the welding seam. Two transformers 5 and 6 are provided, the transformer 5 being connected to the phases I and II of a three-phase current supply circuit energized from a main transformer T, while the transformer 6 is connected to the phases I and III of the same supply circuit. The electrode 2 and the work pieces 4 are connected to the transformer 6. The electrode 1 and the work pieces are connected to the transformer 5. The holder 3 is insulated from the work piece 4. The electrode 1 is manually guided to provide a manually controllable arc close to the arc struck between the fixed electrode 2 and the work pieces. During operation the latter arc burns continuously and independently of the arc at electrode 1, since the distance between the work piece and the electrode 2 remains unchanged while this electrode is being consumed. This is so because the hand end of the pivoted electrode lies constantly on the work piece due to the action of gravity. The flow of slag from the electrode 2 and its arc can be controlled by the arc of the manually-controlled electrode 1. More particularly, it is possible in this way to prevent the so-called "first running" of the slag emanating from the fixed electrode 2. A bare welding rod may also be employed as the fixed electrode it being then merely necessary to maintain the electrode end at the proper distance from the work piece by distance pieces of fusible material or by welding powder sprinkled on the work piece surface, the distance pieces and the welding powder consisting of insulating materials. Since the electrode 1 is manually-guided, an arc may be maintained between this electrode and the work piece, or between this electrode and the fixed electrode, according to necessity.

The invention may also be applied to work in which the welding seam is vertical or inclined. In this case, the fixed electrode can be pressed against the work by the action of a spring or the like.

Figure 2:
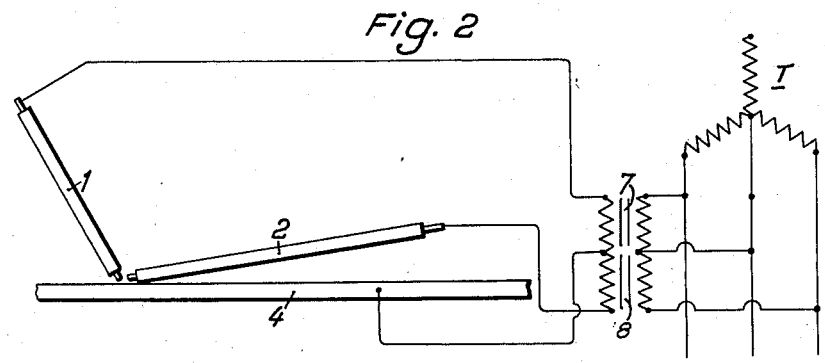

In the embodiment shown in Figure 2, the fixed electrode, the work piece and the manually controlled electrode are designated by the same reference numerals as in Figure 1. Two transformers 7 and 8 are provided which are connected on the one hand to the zero point of a star-connected transformer T and on the other hand to respectively different phase conductors of the transformer circuit. This has the advantage that a higher voltage prevails between the electrodes 1 and 2 than between the work piece 4 and each of the electrodes.

Figure 3:
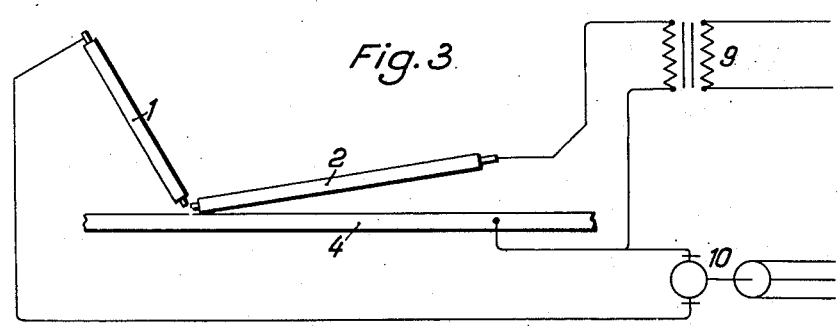
Fig. 3 shows a modification in which the circuit of the fixed electrode is energized from a transformer, and the circuit of the manual electrode is connected to a converter.

In the embodiment shown in Figure 3, a transformer 9 and a converter 10 are provided, the transformer being connected to the work piece and the fixed electrode 2, while the converter is connected at one pole to the work and at the other pole to the manually-guided electrode 1. This embodiment of the invention has the further advantage of a reduced blowing tendency of the arc between the fixed electrode 2 and the work piece 4.

Figure 4:
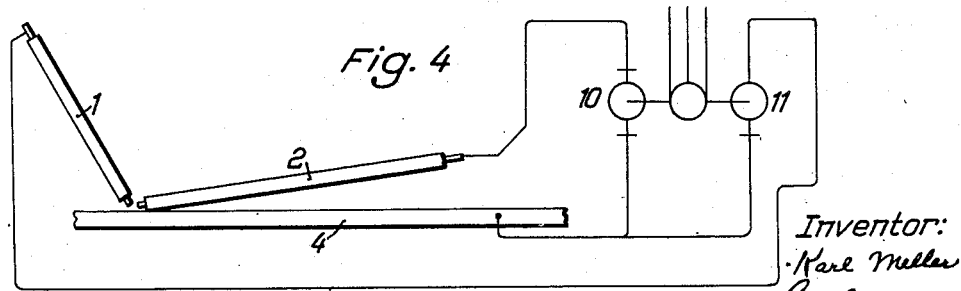
Fig. 4 shows a modification in which a converter is connected between each electrode and the work.

Figure 4 shows two converters 10 and 11, one pole of each of these converters being connected to the work piece 4, while the other pole of the converter 10 is connected to the fixed electrode 2 and the other pole of the converter 11 is connected to the manually-guided electrode 1. This embodiment of the invention permits operating with any predetermined polarity of the electrodes.

In the embodiment shown in Figure 5, two fixed electrodes 12 and 13 are connected to the terminals of a transformer 14. In addition, a converter 15 is provided whose terminals are connected respectively to the work piece 4 and to the manually-guided electrode 1. This method of operation has the great advantage that the continuous arc burns between fixed electrodes, so that the heating of the work piece is kept relatively low.

The embodiment shown in Figure 6 includes a converter 16 whose poles are connected to the work piece 4 and to the manually-guided electrode 1 respectively. The conductor 17 leading to the manually-guided electrode comprises a shunt impedance 18 whose terminals are connected to the coil 19 of a relay 20. A transformer 21 is provided for energizing the fixed electrode 2. The contacts of the relay lie in the lead 22 connecting the transformer to the fixed electrode 2. The transformer lead 23 is connected to the work piece 4. This arrangement has the advantage that when the current in lead 17 is interrupted by removal of the manually-guided electrode 1, the current in the circuit of the fixed electrode is simultaneously interrupted because the coil 19 is then de-energised and the relay 20 opens. When striking an arc at the manually-guided electrode the reverse process occurs.

In the method according to the invention the diameter of the fixed electrode may be selected within a very large range. For example, if it is desired to secure good burning-in, the fixed electrode is of a relatively small diameter. On the other hand, for seams of large cross-section the diameter of the fixed electrode may be made larger than has been feasible in manual welding, for example, 10 mm. and more. The fixed electrode may also be of greater length than heretofore customary. For serial welding in which the same seam length frequently occurs, for example in tube welding, special electrodes may also be provided which are exactly equal in length to the seam.

Particularly for V-seams and angle seams, the fixed electrode may advantageously be provided with a thin jacket or casing, whereby the advantage of a small arc length is obtained. With this method very little oxygen or nitrogen penetrates into the fluid iron. In order to meet all requirements for good welding, the manually-guided electrode can in this case be provided with a coating thicker than usual.

In accordance with a further feature of the invention, the pivotal mounting of the end of the fixed electrode may be given such a design that the electrode can automatically move in the direction of the welding work during the consumption of the electrode, so that the inclination of the electrode remains substantially constant.

While Figure 5 shows that two fixed electrodes may be employed instead of one, these electrodes being arranged one above the other, it is also possible to employ more than two electrodes, and in this case each electrode may have a separate covering or they may all have a common covering.

The invention can also be advantageously applied to "filler" welding.

The expressions "transformer" and "converter" as used above preferably mean such transformers or converters as are specially suited for welding operations, particularly with regard to their electric characteristics.

Referring now to Figure 7, a bent electrode 25 is gripped at one end of an intermediate holder member 26 which is pivotally secured at one end to a bearing bracket 27, at which end the current cable 48 is preferably also connected with the holder member. The bracket 27 has an insulated base plate 28 and is so disposed that the electrode extends in the same plane as the welding seam. The curvature of the electrode is such that the angle in relation to the work remains substantially constant during the welding operation. As in Figures 1 to 6, the manually-guided electrode is designated by the reference numeral 1.

The use of a bent electrode permits the welding of rectilinear seams and cylindrical circular seams, that is to say, those provided on cylindrical work pieces or those following a circular course on flat work.

With such seams, however, the best suitable curvature of the bent electrode is dependent upon the diameter of the cylinder or upon the radius of the flat curve to be welded. The welding of a cylindrical circular seam is shown in Figure 8 from which the correspondingly greater curvature of the electrode 29 is apparent.

Figures 9 and 10 show the welding of a circular seam on flat work. In this case the fixed electrode 30 has a double curvature. The vertical projection of the electrode shown in Figure 10 shows a circular curvature, while the horizontal projection in Figure 9 shows substantially the same curvature as in Figure 7.

Preferably, the covering selected for the bent electrode is as thinly liquid as possible so that the slag will rise more readily. On the other hand, the coating of the manual electrode is more thickly liquid.

For the welding of fairly long seams, the fixed electrode is preferably of greater length than heretofore customary, for example of about 2 mm., so that further time is saved.

Figure 11:
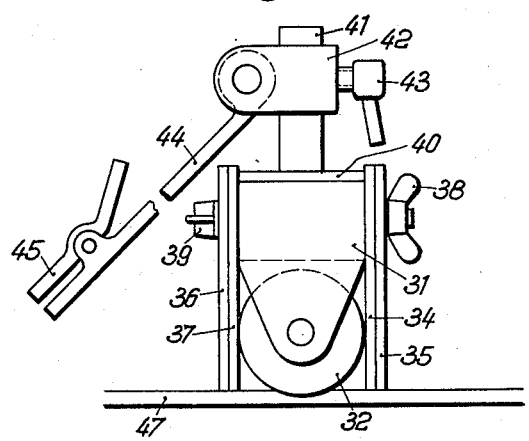
Fig. 11 shows a movable holder in side elevation.
Figure 12:
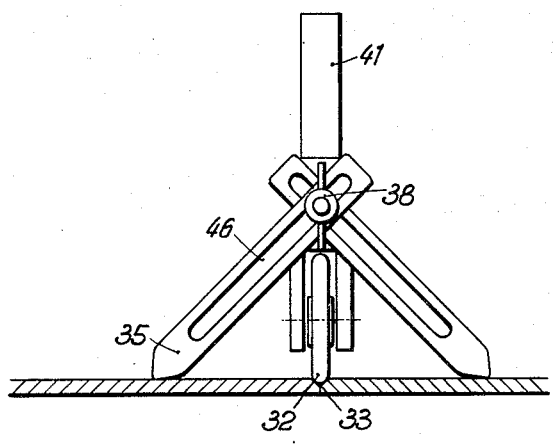
Fig. 12 shows part of the same holder in front elevation.

In the embodiment of Figures 11 and 12, a holder 31 carries a roller 32 which engages a prepared welding kerf or gap 33. The holder is supported by four adjustable guide bars 34, 35, 36 and 37 each of which has a longitudinal slot 46. The assembly of guide bars is held fast in its adjusted positions by wingnuts 38 and 39.

When the holder is moved in the direction in which the welding seam progresses, the roller 32 runs in the kerf or gap 33, the lower ends of the guide bars then sliding on the work piece 47. The upper part 41 of the holder is joined with the lower part 31 by an insulating plate 40 and carries a displaceable sleeve 42 fastened by means of a clamping screw 43.

An intermediate member 44 is pivotally connected at one end to the sleeve 42 while the other end forms electrode tongs 45, in which the mechanically operated electrode is gripped. The roller 32 may be replaced by a guide pin for engagement with, and guidance by the welding kerf or gap 33, such a pin being particularly suitable for the welding of angle seams.

The movable holder may also have two or more rollers and only two guide bars and, furthermore, it may be provided with a driving motor or be moved forward mechanically by other means.

Figure 13:
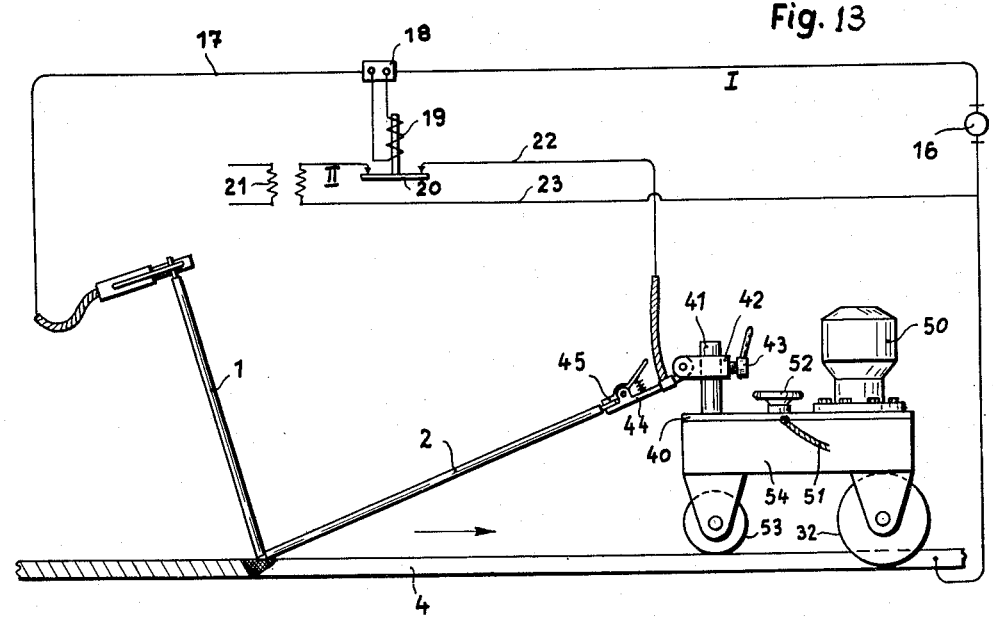
Fig. 13 illustrates another modification of a complete welding apparatus comprising a movable electrode holding device shown in side view.
Figure 14:
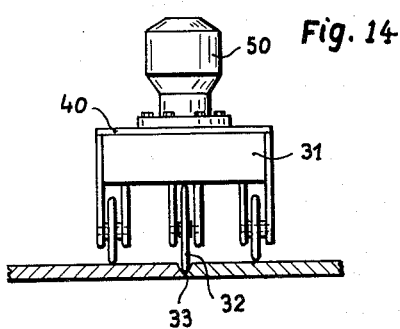
Fig. 14 is a schematic front view of the same electrode holding device.

Thus, in the embodiment shown in Figs. 13 and 14, an electrode holding device, otherwise similar to that of Figs. 11 and 12, is driven by a motor 50 which is energized through a cable 51 and may be set to a desired speed by means of a regulator member 52. The body 54 of the device has rollers 53 running on the work piece surface and has also a guide roller 32 engageable with the welding gap as in the embodiment of Figs. 11 and 12 previously described. The electrode circuits of Fig. 13 are in accordance with Fig. 6 and denoted by the same respective reference numerals.

I claim:

1. Arc welding apparatus, comprising two welding-current supply circuits having a common lead for connection to welding work pieces and having two respective other leads, an electrode holding device placeable upon the work material at the seam to be welded, a first electrode of welding metal having one end pivotally mounted on said device and having a bias toward the work piece surface so that, during operation, said first electrode is inclined toward said surface in the direction of the seam and has its other end close to said surface, said first electrode having its pivoted end electrically connected to said other lead of one of said supply circuits for maintaining a first welding arc, and manually operable electrode means having a rod electrode of welding metal and having a flexible current supply cable connecting said latter rod electrode with said remaining lead whereby said latter electrode is freely movable along the seam to produce a manually controllable second welding arc adjacent to said first arc, and a relay device having normally open switch means series connected in said one supply circuit and having a control circuit connected with said other supply circuit for controlling said switch means to close said one supply circuit in response to the flow of current through said manually controllable arc.

2. Arc welding apparatus, comprising two welding-current supply circuits each having a lead for connection to the work and each having another lead, an electrode holding device having an insulated mounting structure and having a holder with a rod of welding metal connected to said other lead of one of said supply circuits, said holder being pivoted on said structure about a pivot axis which in the operative position of said device extends horizontally transverse to the welding-seam direction in vertically spaced relation to the work surface to then hold said rod inclined to the work surface for maintaining a first welding arc at the seam, and a manually operable holder with a rod of welding metal, said latter holder having a flexible connection with said other lead of said other circuit and being freely movable to permit drawing a manually controllable second welding arc adjacent to the first arc, and a relay having normally open contact means series connected in said one supply circuit and having coil means for controlling said contact means, said coil means being connected with said other supply circuit to close said contact means in dependence upon flow of current through said manually controllable arc.

3. Arc welding apparatus, comprising two welding-current supply circuits each having a lead for connection to the work and each having another lead, an electrode holding device having an insulated mounting structure and having a holder with a rod of welding metal connected to said other lead of one of said supply circuits, said holder being pivoted on said structure about a pivot axis which in the operative position of said device extends horizontally transverse to the welding-seam direction in vertically spaced relation to the work surface to then hold said rod inclined to the work surface for maintaining a first welding arc at the seam, and a manually operable holder with a rod of welding metal, said latter holder having a flexible connection with said other lead of said other circuit and being freely movable to permit drawing a manually controllable second welding arc adjacent to the first arc, said electrode holding device being movable along the seam to be welded and having guide means engageable with the seam gap for guiding said device along the seam to be welded, and a plurality of guide bars mounted on said device at both sides respectively of said guide means and engageable with the work piece surface.

4. The method of arc welding, which comprises pivotally holding a first rod electrode of welding metal inclined to the work surface in the direction of the seam to be welded, maintaining a first welding arc of substantially constant arc length between the electrode end and said surface, and moving said electrode during welding along the seam direction, manually guiding a second rod electrode of welding metal along the seam to be welded, drawing from the second electrode a second arc adjacent to said first arc, and energizing the first arc in dependence upon flow of current through the second arc.

5. Arc welding apparatus, comprising two welding-current supply circuits having a common lead for connection to a welding work piece and having respective other leads, a wheeled mounting structure in rolling engagement with the work piece surface when in operation to be movable along the seam to be welded, an electrode holder and an electrode rod of welding metal fastened in said holder during welding operation, said holder being pivoted to said structure about an axis parallel to said surface and spaced therefrom for holding said rod inclined against the work piece in the direction of the seam, said holder being electrically connected to one of said other leads for maintaining a first welding arc, and a manually operable second holder and another electrode rod of welding metal fastened in said holder during welding operation, said second holder having a flexible cable connected with said remaining lead and being freely movable relative to said structure for producing a manually controllable second welding arc adjacent to said first arc.

References Cited in the file of this patent

UNITED STATES PATENTS

| Number | Name | Date |
| --- | --- | --- |
| 1,707,036 | Zack | Mar. 26, 1929 |
| 1,807,961 | Burnish | June 2, 1931 |
| 1,938,819 | Eskilson | Dec. 12, 1933 |
| 2,028,780 | Ito | Jan. 28, 1936 |
| 2,163,439 | Somerville | June 20, 1939 |
| 2,204,545 | Faunce | June 18, 1940 |
| 2,243,368 | Aiken | May 27, 1941 |
| 2,259,118 | Somerville et al. | Oct. 14, 1941 |
| 2,340,093 | White | Jan. 25, 1944 |
| 2,376,943 | Smith | May 29, 1945 |
| 2,437,840 | Steward et al. | Mar. 16, 1948 |
| 2,478,985 | Steward et al. | Aug. 16, 1949 |
| 2,489,002 | Babbitt | Nov. 22, 1949 |
| 2,583,507 | Carpenter et al. | Jan. 22, 1952 |